United States Patent [19]

Peek, Jr.

[11] Patent Number: 4,663,496

[45] Date of Patent: May 5, 1987

[54] CABLE SYSTEM WITH SUSPENDED WIND DAMPER AND METHOD OF INSTALLING A WIND DAMPER

[76] Inventor: Billy J. Peek, Jr., 286 Mesquite Rd., Bishop, Calif. 93514

[21] Appl. No.: 764,949

[22] Filed: Aug. 12, 1985

[51] Int. Cl.⁴ .......................... H02G 7/14; H02G 7/10
[52] U.S. Cl. ........................................ 174/42; 29/434; 174/41; 248/61
[58] Field of Search ..................... 174/41, 42; 248/61; 29/428, 434

[56] References Cited

U.S. PATENT DOCUMENTS

D. 207,317  4/1967  Wright .............................. 174/42 X
2,595,857  5/1952  Kinsel ................................ 174/41 X Primary Examiner—Laramie E. Askin
Attorney, Agent, or Firm—Knobbe Martens Olson & Bear

[57] ABSTRACT

An improved fastener system supports an aerodynamic wind damper below a cable system. The cable system comprises a suspension support strand that supports a cable, such as a telephone cable. The fastening system comprises a spacer interposed between the support strand and the cable to maintain the support strand and the cable in a spaced-apart relationship. A cable strap, preferably of stainless steel, is wrapped around the support strand and the cable to cinch the support strand and the cable to the spacer. The cable strap is further wrapped around the support strand and the cable with a portion of the strap lying below and spaced apart from the cable to provide a means for supporting the aerodynamic wind damper below the cable in a manner permitting the pivotal movement thereof.

11 Claims, 6 Drawing Figures

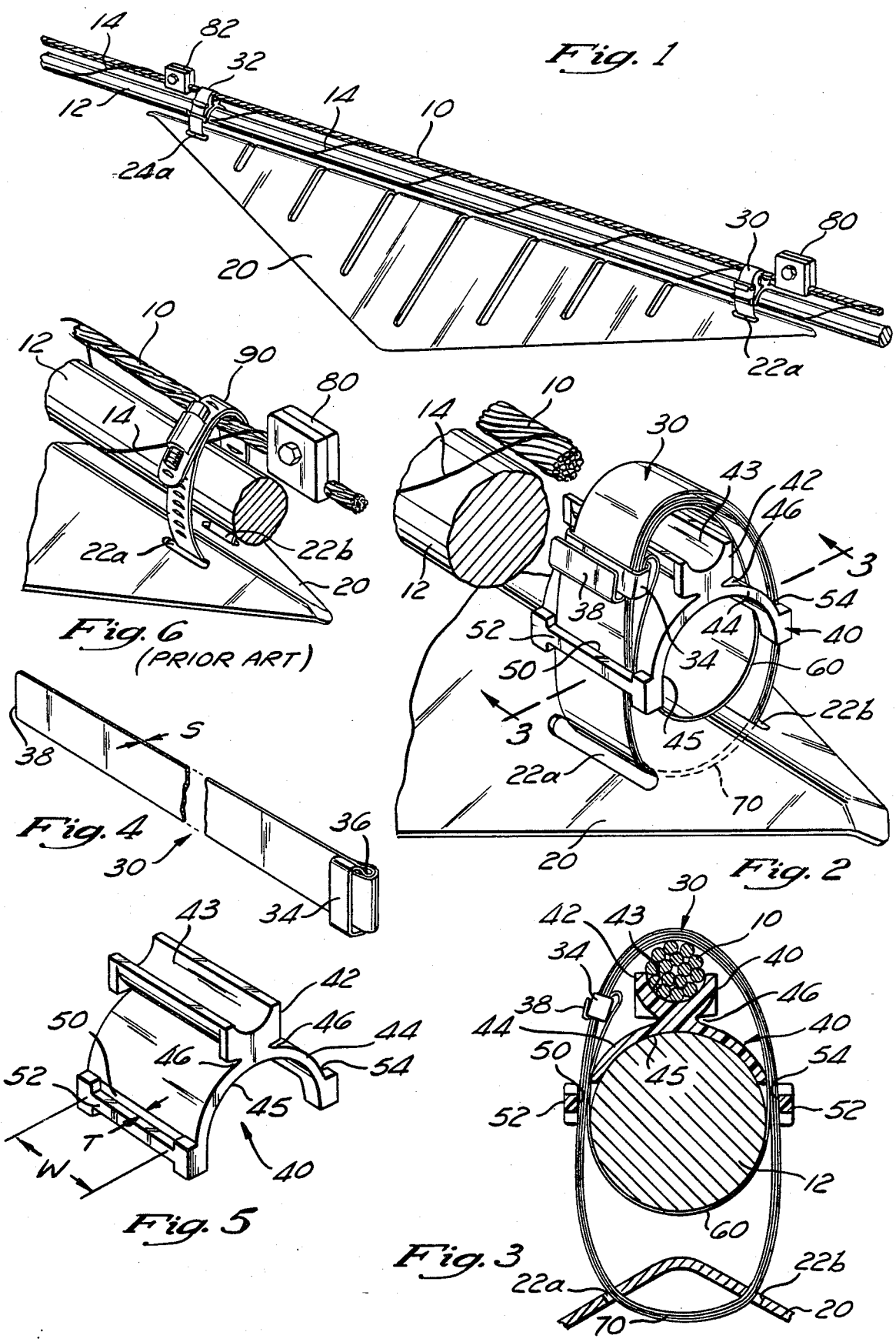

CABLE SYSTEM WITH SUSPENDED WIND DAMPER AND METHOD OF INSTALLING A WIND DAMPER

FIELD OF THE INVENTION

The present invention relates to telephone lines and other transmission cables supported between adjacent suspension structures by a cable support strand, and more particularly, to the fastening system used to attach vibration dampers to the cable system in areas where wind-induced vibraton is a problem.

BACKGROUND OF THE INVENTION

Telephone cables strung between spaced cable supports, typically telephone poles, are a familiar sight throughout the country, particularly in rural areas. A telephone cable normally consists of a plurality of twisted pair wires enclosed in a protective outer jacket. The telephone cables often have an outside diameter in excess of 2½ inches (6.4 cm) and can weigh more than 6 pounds per lineal foot (8.9 kg/m). Therefore, it is a common practice to provide a cable support strand between the spaced-apart poles to support the weight of the telephone cable and reduce the strain on the electrical cable. A typical support strand can be a ⅜ inch to ½ inch diameter (1–1.3 cm) chromium-steel multi-wire strand. The telephone cable is supported by and hangs below the support strand, being attached thereto by lashing wire or other, similar means. For example, when lashing the telephone cable to the support strand, a chromium-steel wire having a diameter on the order of 0.045 inch (1 mm) is wrapped around the support strand and the telephone cable in a spiral-like manner between the supporting poles. Thus, the telephone cable and the support strand act as one system with the support strand carrying the entire weight of that system.

When a telephone cable and a support strand are mounted in the manner described above, there is generally in excess of 100 feet (30.5 m) of cable between supporting poles. The large diameter of the telephone cable combined with this length between poles presents a significant surface area to wind-generated high air flow velocities blowing on the cable. As the wind vector becomes more perpendicular to the longitudinal axis of the cable, there is a strong tendency for the cable to initiate a looping, harmonic oscillation about the longitudinal axis of the cable. This tendency increases with wind speed, leading to metal fatigue and failure—disrupting transmission service over the cable. In order to prevent breakage, telephone and power companies have utilized a system of aluminum vibration dampers that are attached to the cable system to inhibit the vibrations cause by wind.

A typical wind damper comprises a sheet of aluminum or other similar material formed into an aerodynamic shape and suspended below the cable system. One such damper, known in the trade as a "bat wing", is shown in U.S. Pat. No. Des. 207,317 issued on Apr. 4, 1967, to Curtis M. Wright. The shape of the damper causes it to "catch" the wind in much the same manner as a sail, dramatically increasing the air resistance of the cable. The added resistance translates to a sufficient energy loss to a potential free harmonic oscillation as to prevent such motion from occurring. In addition, the resistance increases with increasing wind speed, matching the increased tendency to generate the oscillation. More than one wind damper can be used in a section of the cable system if the distance between adjacent poles is great or the cable system is in a high wind area.

In order to be effective, the wind damper must be allowed to pivot freely about the lower half of the cable system. In the current state of the art, the wind damper is supported by a pair of screw clamps, identical to those frequently used as automotive hose clamps, (i.e., periodic slots are formed in a metal band with a screw that is engageable with the slots located at a non-slotted end to tighten the band around the hose or, in this case, the supported cable system). Unfortunately, the screw clamps are not particularly suited for the stresses applied by the cable/damper system, and a high failure rate has been encountered. One reason for the failures resides in the structure of the screw clamp itself. The slots in the metal band weaken the band, and the clamp was really not designed to withstand the variable peak loading characteristics inherent in the wind damper system. Over time, metal fatigue occurs until the band can no longer respond to loads caused by shifts in the wind and breaks.

A second failure mode results from the requirement that the wind damper support must allow the wind damper to freely pivot. This freedom is accomplished by hanging the wind damper from a screw clamp that has been loosely mounted about the suspended cable. The tendency for the wind dampers to longitudinally move along the wire is resisted by the placement of lashing wire clamps (known as "bug nuts") adjacent the clamps on the supported cable. These clamps always loosen, and under certain wind conditions, the hose clamp can "jump" and can move past the lashing wire clamp and allow the wind damper to move along the wire.

The screw clamps are expensive and telephone companies have found that there is a significant cost in labor and materials to install and maintain the wind dampers in proper operational condition. Therefore, a need exists for an improved system for mounting the wind dampers to a telephone cable system.

SUMMARY OF THE INVENTION

The present invention is an improved fastening apparatus and method for supporting a wind damper below a cable system comprising a support strand and an energy transmission cable, such as a telephone cable, supported while suspended between adjacent cable supporting structures by the support strand. The fastener consists of a cable spacer that separates the support strand from the cable, with a first end of the spacer positioned in contact with the support strand and a second end of the spacer positioned in contact with the telephone cable. A cable strap, comprised of stainless steel or other suitable material, is wrapped around the telephone cable and the support strand with at least one full turn to bind the telephone cable, the cable spacer, and the support strand to one another as a unit in a fixed, spaced-apart relationship, thereby providing a cinch attachment of the electrical cable to the support strand. Additional turns of the cable strap are wrapped around the telephone cable and the support strand with a portion of the cable strap in each turn below, and spaced apart from, the telephone cable to provide a means for supporting the wind damper. Each of these additional turns is passed through a connection means on the damper to support the damper. In the preferred embodiment of the damper shown in U.S. Pat. No. Des.

207,317, the cable strap is passed through a pair of slots in the damper.

The cinch attachment of the cable, spacer, and support strand formed by at least one turn of the cable strap tightly wound around the telephone cable and the support strand, provides a substantial amount of friction to prevent longitudinal movement of the wind damper with respect to the telephone cable and the support strand. In addition, a lashing wire clamp can be applied adjacent to the spacer to further inhibit the longitudinal movement. Since at least one turn of the cable strap is tightly cinched to the support strand, the cable strap cannot pass over the lashing wire clamp.

The present invention has the further advantage that the cable strap, such as the stainless steel strap, is a solid piece of material having no slots or perforations. The cable strap is unlikely to break even in the presence of extremely high winds.

The method of the present invention comprises the steps of placing a spacer between a suspension support strand and a telephone cable and wrapping at least one turn of a cable strap around the separated suspension strand and telephone cable to thereby hold the support strand, spacer, and telephone cable in a fixed, spaced-apart relationship. The method includes the further step of wrapping additional turns of the cable strap around the support strand and the telephone cable with at least a portion of each turn below and spaced apart from the telephone cable to form a loop that will receive and support a wind damper below the telephone cable. During the steps of wrapping the additional turns, the cable strap is also passed through a pair of slots or other suitable connecting means on the wind damper.

In the preferred embodiment of the present invention, the cable strap has a buckle loop for holding and terminating the ends of the strap.

Various other objects, advantages and features of the present invention will become readily apparent from the ensuing detailed description, and the novel features will be particularly pointed out in the appended claims.

BRIEF DESCRIPTION OF THE DRAWINGS

FIG. 1 is a perspective view of the present invention in use to support a wind damper on a cable system comprising a transmission cable lashed to a suspension support strand;

FIG. 2 is an enlarged partial perspective view of the apparatus of the present invention showing the use of the spacer and the metal strap to support the wind damper below the cable system;

FIG. 3 is a partial cross-sectional view of the present invention taken along the lines 3—3 in FIG. 2;

FIG. 4 is a partial perspective view of the cable strap shown in FIGS. 2 and 3;

FIG. 5 is a perspective view of the cable spacer used in the present invention; and FIG. 6 is a partial perspective view of a prior art wind damper support using a screw clamp.

DESCRIPTION OF THE PREFERRED EMBODIMENT

FIGS. 1, 2, and 3 illustrate the use of the present invention to support a wind damper on a telephone or other transmission cable system. A suspension support strand 10 is suspended between two support poles (not shown) or other cable supports such as towers, or the like. The support strand 10 is typically chromium-steel or other suitable material in general use by telephone companies. Below the support strand 10 is a telephone cable 12. The telephone cable 12 is a conventional multi-wire cable having a plurality of wires (not shown) surrounded by a protective outer covering. The telephone cable 12 is supported from the support strand 10 by a plurality of turns of a lashing wire 14. The weight of the telephone cable 12, which can be in excess of 6 pounds per foot, is thus supported between the support poles by the support strand 10.

In order to prevent oscillations of the cable system, consisting of the cable 12 and the support strand 10, a wind or vibration damper 20 is connected to the cable 12 and the support strand 10 at a location between the support poles. In the embodiment shown in the drawings, the damper 20 has a pair of slots 22a, 22b (shown in FIGS. 2 and 6) proximate to a first end of the damper 20 and a symmetrically placed second pair of slots 24a, 24b (24b not shown) proximate to the second end of the damper 20. The pairs of damper slots 22a, 22b, 24a, 24b provide a means for connecting the damper 20 to the cable system so that the damper 20 can be suspended below the cable system. Dampers other than the exemplary damper shown may have other connecting means. A first cable strap 30 is used to form a plurality of turns that are passed through the first pair of damper slots 22a, 22b to support the wind damper 20 from the suspension strand 10. A second cable strap 32 similarly passes through the second pair of damper slots 24a, 24b to suspend the end of the wind damper 20 from the support strand 10.

Shown best in FIG. 4, the cable strap 30 in the preferred embodiment comprises a ¾ inch wide stainless steel band with a buckle loop 34 at one end for terminating a first end 36 of the steel band. As will be seen below, the buckle loop 34 is also used to restrain a second end 38 of the steel band 30 when the steel band 30 is in place and supporting the damper 20. The steel band cable straps contemplated by the present invention are commercially available parts used by telephone companies and the like for purposes other than described herein.

FIG. 2 shows an enlarged view of the present invention in place and supporting the damper 20. The telephone cable 12 and the support strand 10 are not shown in their entirety in order to be able to better show the details of the present invention. One should recognize that the telephone cable 12 and the support strand 10 pass through the invention as described below and as shown in other views. In addition to the first cable strap 30, the present invention includes a cable spacer 40. The cable spacer 40, shown in more detail in FIG. 5, comprises a first contoured end 42 that has a shape and size selected to conform with the outer circumference of the support strand 10. As illustrated, the first end 42 has a first concave trough 43 formed therein to receive the suspension strand 10. The inside radius of the first trough 43 formed in the first end 42 can be selected to accommodate support strands of different diameters.

The cable spacer 40 also has a second contoured end 44 that is provided with a second concave trough 45 formed therein to accommodate the outer circumference of the telephone cable 12. The first end 42 and the second end 44 are interconnected by a neck portion 46. The length of the neck portion 46 is selectable so that a desired spacing can be maintained between the support strand 10 and the telephone cable 12.

The cable spacer 40 also includes a first spacer slot 50 formed on the second end 44. The first spacer slot 50 has a width (shown as W) slightly greater than the width of the steel strap 30. The spacer slot 50 preferably has a thickness (shown as T), defined by an outer bar 52, that is greater than four times the thickness of the cable strap 30 (shown as S in FIG. 4). A second spacer slot 54 having the same approximate dimensions can advantageously be provided on the opposite side of the second end 44.

The cable spacer 40 is made of black polyethylene or other suitable material to provide a small amount of flexibility, preventing abrasion of the telephone cable 12, while providing a basis for frictional contact with the telephone cable 12 and the support strand 10. The cable spacer 40 is commercially available in a number of sizes to accommodate support strands 10 and cables 12 of varying diameter, and to control the amount of spacing therebetween. The cable spacers 40 are presently used by the telephone companies in conjunction with screw clamps and cable straps to space telephone cables apart from support strands in order to provide room for splice housings, loading coil cases, and the like.

Returning to FIG. 3, the chronology for obtaining the present inventive fastener proceeds as follows: The cable strap 30 is positioned with the buckle loop 34 above the first spacer slot 50. The second end 38 of the cable strap 30 is passed through the spacer slot 50 and around the telephone cable 12 and back through the second spacer slot 54, over the support strand 10, through the buckle loop 34 and then again through the first spacer slot 50. A pulling or tensile force is applied to the second end 38 of the cable strap 30 to cause the cable 12 and the support strand 10 to become cinched together by that portion of the cable strap 30 surrounding the telephone cable 12 and the support strand 10. The telephone cable 12 and the support strand 10 are thereupon in snug, frictional contact with the second contoured surface 44 and the first contoured surface 42, respectively, of the cable spacer 40. The support strand 10 and the telephone cable 12 are retained in a fixed, spaced-apart relationship with the distance between the two determined by the length of the neck 46 of the cable spacer 40. Advantageously, and in a preferred embodiment, an additional length of the cable strap 30 can be passed around the telephone cable 12 in the described manner to provide two full turns of the cable strap 30, thus strengthening the cinch attachment of the cable strap 30 to the suspension support strand 10 and the cable 12.

The second end 38 of the cable strap 30 is then passed through the damper slots 22a, 22b and then back through the second spacer slot 54. Thereafter, the end 38 is passed around the top of the support strand 10, through the buckle loop 34, through the first spacer slot 50, back through the damper slots 22a, 22b, again through the second spacer slot 54, and through the buckle loop 34, to provide at least two turns of the cable strap 30 through the damper slots 22a, 22b. Preferably, the cable strap 30 is selected to have a sufficient length to pass the end 38 on more time through the first spacer slot 50, the damper slots 22a, 22b, the second spacer slot 54, around the top of the support strand 10, and through the buckle loop 34. The second end 38 of the cable strap 30 is then bent backwards around the outside of the buckle loop 34 to hold the cable strap 30 in place.

When positioned as described above, the cable strap 30 provides a binding or cinching portion 60 (FIGS. 2 and 3) of at least the first turn that is positioned directly below and in contact with the telephone cable 12. The cinching portion 60 of the cable strap 30 holds the telephone cable 12 snugly against the second concave trough 45 of the spacer 40. The additional turns of the cable strap 30, separated from the cinching portion 60, form a support loop portion 70 that passes through the damper slots 22a, 22b. The support loop portion 70 is spaced apart from the cinching portion 60 by a distance sufficient to allow the wind damper 20 to swing and freely pivot on the support loop portion 70. The top of the wind damper 20 thereby does not strike nor abrade the bottom surface of the telephone cable 12.

Returning to FIG. 1, the second cable strap 32 is attached to the suspension strand 10, the telephone cable 12, and through the second pair of damper slots 24a, 24b (not shown) in the same manner as described above in connection with the first metal cable strap 30. Thus the wind damper 20 is supported at both ends thereof. As is also shown in FIG. 1, a first lashing clamp 80 and a second lashing clamp 82 may be positioned adjacent to the first and second cable straps 30, 32, respectively, to further inhibit any tendency of the wind damper 20 to move longitudinally with respect to the telephone cable 12 and the support strand 10. The lashing clamps 80, 82 are commercially available parts used to terminate loose ends of the lashing wire 12 by clamping them to the support strand 10, and to prevent a complete unraveling of the lashing wire should a break occur.

In operation, the wind blowing against the wind damper 20 causes a substantially static stress to be applied to the telephone cable 12 and the support strand 10. The static stress inhibits the development of free harmonic vibrations in the support strand 10 and the telephone cable 12 caused by the motion of the air. The first turn of the cable strap 30 around the support strand 10 and the telephone cable 12 cinches the telephone cable 12, the support strand 10, and the cable spacer 40 snugly together such that there is little or no movement on the circumferences of the support strand 10 and the telephone cable 12 to cause abrasion. Therefore, the movement of the wind damper 20 in response to changes in wind speed and direction is not likely to cause any damage to the telephone cable 12 or the support strand 10. Since the cable strap 30 is preferably a stainless steel band, the action of the damper slots 22a, 22b on the support loop portion 70 of the cable strap 30 is unlikely to damage the cable strap 30 or to cause its breakage. Therefore, unlike other previously known devices and methods for installing wind dampers on telephone cables, the apparatus and method of the present invention is highly unlikely to break even during severe or sustained wind conditions.

FIG. 6 illustrates a typical prior art device that the present apparatus and method are intended to replace. The support strand 10, the telephone cable 12, the wind damper 20, and the lashing clamp 80 are the same as or similar to the corresponding elements described above. In the prior art, the wind damper 20 is supported from the support strand 10 with a screw clamp 90. The screw clamp 90 is installed in a conventional manner wih the free end of the screw clamp 90 passed around the support strand 10 below the telephone cable 12 and through the damper slots 22a, 22b. The free end of the screw clamp 90 is then engaged with the threads of the tightening screw and the screw clamp 90 is adjusted until the top of the wind damper 20 is spaced apart from the bottom of the telephone cable 12 by a selected distance. The screw clamp 90 must have a loose fit to allow the wind damper 20 to freely pivot below the telephone cable 12. The wind damper system is thus not actually attached to the suspended cable and is restrained from moving along the length thereof by the lashing clamps 80. The screw clamps 90 have an inherent tendency to loosen, allowing the clamps 90 to pass over the lashing clamps 80 and freely move along the suspended cable in response to changes in the wind. Since the wind damper 20 should be placed at a location on the telephone cable 12 for optimal damping effect, movement of the wind damper 20 from its original position is undesirable. As set forth above, the apparatus and method of the present invention prevent this from occurring since the cable strap 30 is cinched tightly to the telephone cable 12 and the top of the support strand 10 and therefore cannot pass over the lashing clamp 80. In addition, since at least the first turn of the cable strap 30 provides a tight fit with the telephone cable 12 and the suspension strand 10, the friction of the cable spacer 40 on the support strand 10 and the telephone cable 12 is sufficient to inhibit movement of the wind damper 20 even in the absence of the lashing clamps 80, 82.

Returning to FIG. 6, the screw clamp 90 used in previously known methods of installation of the wind damper 20 has the further disadvantage that since the screw clamp 90 is not tightly bound to either the support strand 10 or the telephone cable 12, the screw clamp 90 moves with respect to the outer surface of the telephone cable 12. There is a tendency of the screw clamp 90 to abrade the outer surface of the telephone cable 12 and potentially damage the inner conductors of the telephone cable 12. Although this problem is commonly partially alleviated by the use of a protective split cable guard (not shown) around the telephone cable 12, the use of the cable guard adds additional expense and labor to the installation of the wind damper 20.

The prior art device shown in FIG. 6 has a further disadvantage that the slots or indentations formed in the strap portion of the screw clamp 90 weaken the screw clamp 90 and therefore provide areas of the screw clamp 90 that are particularly susceptible to breakage under heavy stress and repeated movement. Although the screw clamps have been used for decades and continue to be the industry-wide means of installing wind dampers, it has been found that use of these screw clamps causes a significant repair and replacement problem in the field.

The apparatus and method of the present invention provides significant cost savings in labor and parts. In accordance with the above-described, previously known method of installation, the screw clamps cost in excess of $1.00 each for installation. Cable guards must be used to protect the cable, and they can cost as much as $0.40 for each wind damper, depending upon the diameter of the cable to be protected. Thus, the installation of each wind damper costs in excess of $2.00 for fastener parts alone. In contrast, each of the two cable spacers used in the present invention costs less than $0.04 each and the metal straps are less than $0.07 each. Thus, the total cost of the materials required to install the present invention is less than $0.22, a tenth of the material cost for the prior known method. There is also a significant savings in time since there is no need to install a cable guard with the present invention. Furthermore, unlike the screw clamps of the prior art, which require a screwdriver or nut driver to install, the cable strap 30 of the present invention does not require any special tools to install.

As can be seen, the present invention provides a significant savings in time and materials for the original installation as well as reducing the probability of having to replace a lost or out-of-place wind damper. Furthermore, since a wind damper that has fallen from the line or has moved from its proper place along the line can result in a broken telephone cable, the use of the inventive fastening system to prevent such damage can provide very significant savings to a telephone company.

Although described above in connection with telephone cables, the present invention can be used with cable television systems or other systems that have a suspension support strand supporting a signal or power cable and that use wind dampers to suppress oscillations in the suspension strand and cable.

While I have disclosed an exemplary structure to illustrate the principles of the present invention, it should be understood that I wish to embody within the scope of the patent warranted hereon, all such modifications as reasonably and properly come within the scope of my contribution to the art.

What is claimed is:

1. In a supported cable system of the type having a suspension support strand attached to and supporting a cable located between adjacent cable supports, with at least one oscillation damper suspended from the support strand and the cable between the cable supports to dampen oscillations caused by high air flow velocities; an improved support fastener for the oscillation damper comprising:
a spacer separating the support strand and the cable in a fixed, spaced-apart relationship, said spacer having a first end receiving an outer portion of the support strand and a second end receiving an outer portion of the cable; and
a cable strap adjacent the spacer forming a cinch attachment of the cable with the spaced-apart support strand and providing a support loop adjacent the cinch attachment that receives the oscillation damper in a manner permitting the partial rotation of said damper about the support strand and cable, whereby the cinch attachment of the cable strap to the spaced-apart cable and support strand provides a solid anchoring of the oscillation damper, preventing lateral movement of the damper along the cable between cable supports of the supported cable system.

2. A supported cable system as described in claim 1, wherein said cinch attachment comprises at least two turns tightly positioned around the spaced-apart support strand and cable.

3. A supported cable system as described in claim 1, wherein said support loop comprises at least three turns around the spaced-apart strand and cable, with each of said turns separated from the strand and cable providing sufficient slack to permit the partial rotational movement of the damper about the support strand and cable.

4. A supported cable system as described in claim 1, wherein said cable strap is stainless steel.

5. A supported cable system as described in claim 1, wherein said cable is an electrical cable.

6. A supported cable system as defined in claim 1, wherein said cable is a telephone cable.

7. A system including an oscillation damper suspended below a cable system having a suspension support strand and a cable supported by said support strand, comprising:
a spacer holding said cable in a fixed, spaced-apart relationship with said support strand; and a cable strap having at least a first turn wrapped around said support strand, said cable, and said spacer and binding said support strand, said cable, and said spacer together at a fixed lateral location with respect to said cable, said cable strap having a supplemental turn with a portion of said strap spaced apart from said cable and supporting said oscillation damper and permitting the partial rotation thereof about said cable system.

8. The system as defined in claim 7 wherein said spacer has a first end conforming to the circumference of the cable and a second end conforming to the circumference of the support strand.

9. The system as defined in claim 7 wherein said oscillation damper has at least two horizontally disposed slots, each of said slots having a length and a width, said length being greater than the width of said strap and said width being greater than the thickness of said strap, said portion of said strap lying below said cable and passing through each of said slots and supporting said oscillation damper.

10. An assembly including a wind damper suspended below a cable system having a suspension support strand and a cable supported by said support strand, comprising:
   a spacer inserted between said support strand and said cable and providing a minimum fixed distance between said support strand and said cable; and
   a strap having a first segment wrapped tightly around said support strand and said cable proximate to said spacer and holding said support strand, said cable, and said spacer in a fixed interrelationship at the minimum fixed distance to each other, said strap having a second segment wrapped around said support strand and said cable in a manner such that a portion of said second segment is below and spaced apart from the cable, said portion receiving and supporting said wind damper below said cable.

11. A method of connecting a wind damper to a cable system having a suspension support strand and a cable supported by said support strand, comprising the steps of:
   inserting a spacer between said support strand and said cable forming a spaced-apart cable system with a first end of said spacer in mechanical contact with said support strand and a second end of said spacer in mechanical contact with said cable;
   wrapping a first segment of a strap around said spaced-apart cable system to tightly bind said support strand and said cable to said spacer;
   wrapping a second segment of said strap around the support strand and the cable of said spaced-apart cable system such that a portion of said second segment is spaced from said cable, said portion of said second segment passing through a connecting means on said wind damper to thereby support said wind damper below said cable; and
   securing the ends of said strap so that said strap remains wrapped around said spaced-apart cable system when force is applied to said wind damper.

* * * * *